United States Patent [19]
Hanson

[11] Patent Number: 6,064,961
[45] Date of Patent: May 16, 2000

[54] DISPLAY FOR PROOFREADING TEXT

[75] Inventor: Gary Robert Hanson, Palm Beach Gardens, Fla.

[73] Assignee: International Business Machines Corporation, Armonk, N.Y.

[21] Appl. No.: 09/145,791

[22] Filed: Sep. 2, 1998

[51] Int. Cl.$^7$ .............................. G01L 13/00; G01L 15/00
[52] U.S. Cl. .......................... 704/260; 704/270; 704/275; 704/235
[58] Field of Search ..................................... 704/235, 270, 704/275, 260

[56] References Cited

U.S. PATENT DOCUMENTS

| | | | |
|---|---|---|---|
| 5,745,875 | 4/1998 | Jackson et al. | 704/235 |
| 5,799,273 | 8/1998 | Mitchell et al. | 704/235 |
| 5,909,667 | 6/1999 | Leontiades et al. | 704/275 |

*Primary Examiner*—David R. Hudspeth
*Assistant Examiner*—Susan Wieland
*Attorney, Agent, or Firm*—Quarles & Brady LLP

[57] ABSTRACT

A method, and corresponding program routine, for displaying text in a proofreader associated with a speech recognition application, comprising the steps of: retrieving initial text responsive to a user request; displaying the initial text in a centered position in a display window of a graphical user interface; retrieving further text responsive to a further user request; replacing the initial text with the further text in the centered position of the display window; and, repeating the retrieving further text step and the replacing step until no further text is requested. Previous text and following text can be selectively retrieved for use in the replacing step. The initial text and the further text can be contextual phrases including a target word and words immediately preceding and following the target word. The target words are displayed in the centered position even if the contextual phrase as a whole is not centered in the display window.

25 Claims, 5 Drawing Sheets

DISPLAY FOR PROOFREADING TEXT

BACKGROUND OF THE INVENTION

1. Field of the Invention

This invention relates to the field of speech applications, and in particular, to an improved method for displaying text in a proofreader and an improved graphical user interface for displaying text during proofreading.

2. Description of Related Art

A proofreader associated with a speech recognition application and which provides word-by-word playback in a user interface of previously dictated text to assist in correction of misrecognition errors and other revisions can be valuable, particularly where the text display is accompanied by an audible playback of the displayed text. The term text is used herein to include individual words as well as compound words and phrases. Speech recognition applications will sometimes recognize compound words and certain phrases as single words, depending upon the manner in which the words are spoken and stored in the vocabulary list of the speech application. Recent implementations of such a proofreader have all involved the highlighting of each word in its original position in the original document. As the words are played back, the highlighting jumps from word to word, requiring the user to follow a quickly moving target with the user's eyes. Such a sequence is illustrated in FIGS. 5(a)–5(d), wherein the words "This", "is", "dictated" and "text" are sequentially highlighted in their original and fixed positions in a display window of the graphical user interface. Unfortunately, this traversal is often very fast and it is extremely difficult for users to track accurately. Indeed, most people read multiple words by focusing at a point in the middle of the words, a technique that is more natural but that is directly opposed to the highlighted traversal method which, instead, requires the user to focus on a single word within a group of words. Eye-fatigue, loss of comprehension and confusion can easily result from this jumping about.

A major and related difficulty in correcting large amounts of dictated text after dictation has ended is that some words, while incorrect, are still correctly spelled. That is, words representing misrecognition errors can nevertheless be valid words which are spelled correctly. In this case, spell checkers will clearly be inadequate. Grammar checkers might provide some error detection, but would by no means be comprehensive. Tracking word positions requires so much concentration that even when audio playback accompanies graphical playback, misrecognized word are often not recognized as errors.

A long-felt need exists for a proofreader which avoids the problems associated with prior art displays of sequentially retrieved words from previous dictation. A related and long-felt need also exists to provide an audible as well as a graphic playback of previously dictated text, particularly in conjunction with sequentially retrieved text.

SUMMARY OF THE INVENTION

The prior art problem of a moving target can be overcome by presenting each text selection in a static, unmoving and bounded visual area, centered in such a way that the user's eye can remain fixed. As the words are played back, each word replaces the previous word centered in the display, allowing the user to read each word without eye tracking movement. Indeed, by freeing the user from the effort of tracking a moving target, it is easier to concentrate on any disparity between the visual display of text and the audible playback of the text.

In accordance with an inventive arrangement, the long-felt needs of the prior art are satisfied by a method for always displaying retrieved text in a centered position in a display window.

In accordance with a further inventive arrangement, the retrieved text is a contextual phrase, in which a target word is surrounded by an immediately preceding word and an immediately following word. In this instance, the target word is displayed in the centered position, even if the entire phrase, as a whole, is not centered.

In accordance with another inventive arrangement, the target words in contextual phrases are visually marked to enhance visual perception, for example by being highlighted, displayed in a box or inversely displayed.

In accordance with yet another inventive arrangement, the text display can be accompanied by an audible playback of the displayed text, which is more useful because users have more attention to focus on the sound of the text, absent the need for rapid visual tracking across the screen display.

A method for displaying text in a proofreader associated with a speech recognition application, in accordance with the inventive arrangements, comprises the steps of: retrieving initial text responsive to a user request; displaying the initial text in a centered position in a display window of a graphical user interface; retrieving further text responsive to a further user request; replacing the initial text with the further text in the centered position of the display window; and, repeating the retrieving further text step and the replacing step until no further text is requested.

The method can further comprise the step of retrieving previous text for use in the replacing step, retrieving following text for use in the replacing step or selectively retrieving both previous and following text.

The method can further comprise the step of audibly playing the displayed text, automatically or responsive to a user request. When text is played, the method can further comprise the steps of: playing an audio recording of the displayed text if an original audio recording of the displayed text as dictated is available; and, playing the displayed text with a text-to-speech engine if the original audio recording is not available.

The method can further comprise the steps of: retrieving the initial text and the further text as contextual phrases including a target word and words immediately preceding and following the target word; displaying the target word in the centered position even if each contextual phrase as a whole is not centered in the display window.

In the case where the initial text and the further text are contextual phrases including the target word and words immediately preceding and following the target word and the contextual phrases are displayed in the centered position even if each contextual phrase as a whole is not centered in the display window, the method can further comprise the step of visually marking the target word. The target word can, for example, be highlighted, displayed in a box or inversely displayed.

The method can further comprise the step of generating the graphical user interface with user activatable icons for selectively retrieving the previous and following text. Alternatively, or in addition, the method can further comprise the step of selectively retrieving the previous and following text responsive to voice commands.

A program routine of instructions stored in a fixed medium for displaying text in a proofreader associated with a speech recognition application, in accordance with the inventive arrangements, comprises: means for generating a user interface having a display window; means for retrieving initial text responsive to a user request; means for displaying the initial text in a centered position in the display window; means for retrieving further text responsive to a further user request; and, means for replacing the initial text with the further text in the centered position of the display window.

The program routine of instructions can further comprise: means for retrieving the initial text and the further text as contextual phrases including a target word and words immediately preceding and following the target word; and, means for displaying the target word in the centered position even if each the contextual phrase as a whole is not centered in the display window.

The program routine of instructions can further comprise means for generating user activatable icons for selectively retrieving the previous and following text, means for selectively retrieving the previous and following text responsive to voice commands, or both.

The program routine of instructions also further comprise means for visually marking the target word.

The program routine of instructions can also further comprise means for audibly playing the displayed text responsive to a user request, means for automatically playing the displayed text, or both.

DETAILED DESCRIPTION OF THE PREFERRED EMBODIMENTS

Figure 1A:
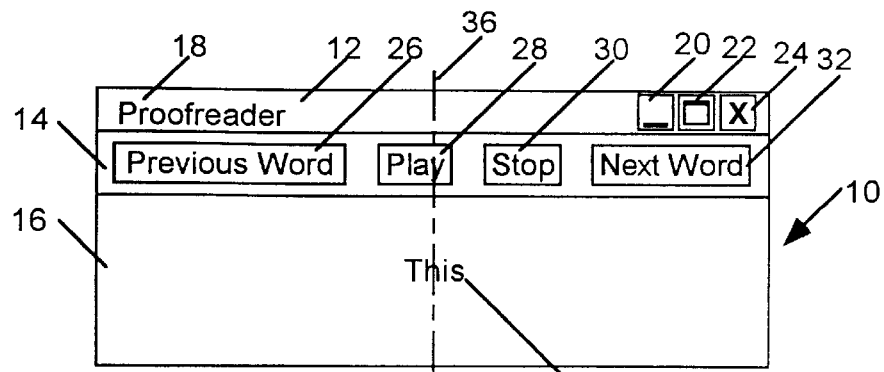
FIGS. 1(a)–1(d) illustrate a graphical user interface showing a first method for sequentially displaying retrieved text in a proofreader in accordance with the inventive arrangements.

In order to simplify presentation of the inventive arrangements taught herein, it is assumed that a speech recognition application can play back recorded audio from a previous dictation session and that the speech application includes a text-to-speech engine for playing text not previously recorded. It is also assumed that there has been a previous dictation session resulting in text which must be proofread, and for which there is a recording of the dictation session which includes some, but not necessarily all of the text which must be proofread.

FIGS. 1(a)–1(d) illustrate a graphical user interface (GUI) 10 in accordance with the inventive arrangements showing a first method in accordance with the inventive arrangements for sequentially displaying retrieved text in a proofreader. The GUI 10 comprises display areas 12, 14 and 16.

Display area 12 includes the name 18 of the application, in this case Proofreader, as well as minimize screen button icon 20, maximize screen button icon 22 and close window button icon 24.

Display area 14 provides button icons that allow the proofreader to be controlled in much the same fashion as any standard multimedia object. The Play button icon 28 and the Stop button icon 30 operate as they would with standard audio. However, the Previous Word button icon 26 and the Next Word button icon 32 function to play the word preceding and following the current word, respectively.

Display area 16 is for displaying the text retrieved for proofreading. In FIG. 1(a), the text 34A is the first word "This" of the dictation session. It can be seen that the text 34A is in a centered position in display area 16, the center being marked by a vertical centerline 36.

Figure 1B:
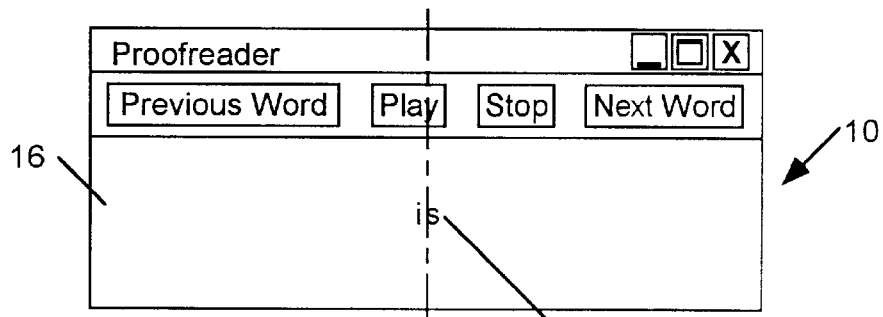

Activating the Next Word button icon 32 results in the display as shown in FIG. 1(b). The text 34A has been replaced by text 34B, which is the word "is" following text 34A. Alternatively, the Next Word command can be invoked by a voice command instead of activation of the button icon.

Figure 1C:
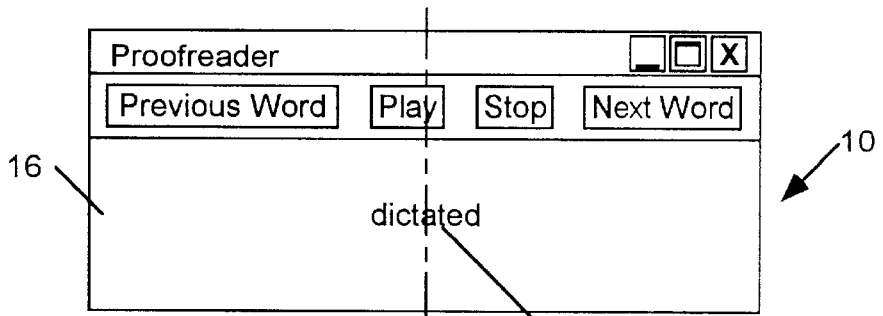
Figure 1D:
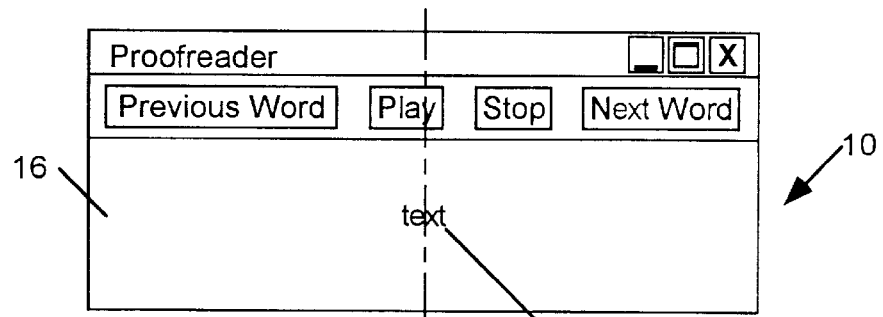

Invoking the Next Word command again results in the display as shown in FIG. 1(c). Text 34B has been replaced by text 34C, which is the word "dictated" following text 34B Invoking the Next Word command yet again results in the display as shown in FIG. 1(d). Text 34C has been replaced by text 34D, which is the word "text" following text 34C. Invoking the Previous Word command at this point would return the display of FIG. 1(c) to the screen.

It should be appreciated that compound words or phrases that are recognized by the speech recognition engine as single words will be retrieved, displayed and centered as though a single word.

The displays shown in FIGS. 1(a)–1(d) can be accompanied by an audible playback of the retrieved text. The playback can be in response to a user request or can be automatic. Text which has been recorded, for example from the dictation session being proofread can be played back from the recording. The words are recorded with tags or other indexing that link the text and the corresponding audio excerpt. In those instances where no recording is available, for example a word that was typed in during the dictation session as an edit, a text-to-speech engine can be used to generate a vocalization of the displayed text.

FIGS. 2(a)–2(d) illustrate the GUI 10 in accordance with the inventive arrangements showing a second method in accordance with the inventive arrangements for sequentially displaying retrieved text in a proofreader. The second method is an optional, preferably user selectable mode, which allows the user to view the preceding and following words along with the current word. In this case, the current word is referred to as the target word of the retrieved phrase of text.

Figure 2A:
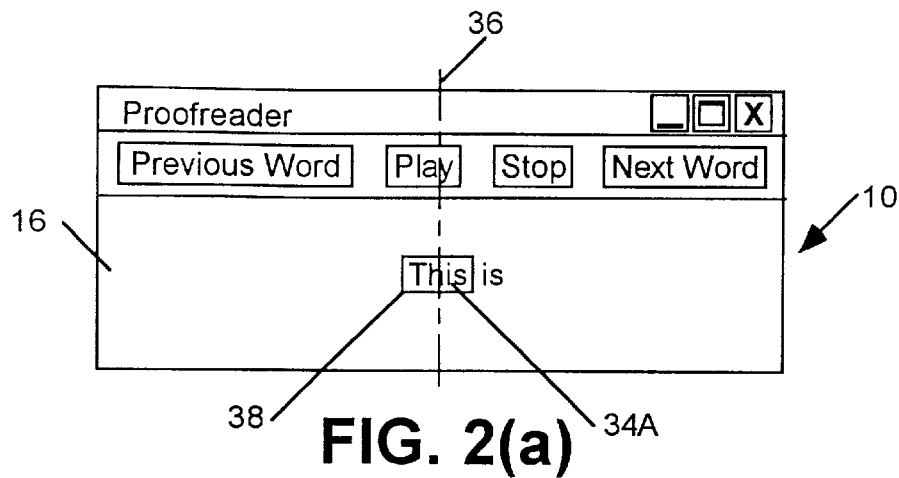
FIGS. 2(a)–2(d) illustrate the graphical user interface showing a second method for sequentially displaying retrieved text in a proofreader in accordance with the inventive arrangements.

In FIG. 2(a), the text 34A is the first word "This" of the dictation session as well as the following word "is" of the dictation session. There is no word preceding "This" so there are only two words displayed. It can be seen that the target word "This" of text 34A is in the centered position in display area 16. Moreover, the target word is visually marked, in this case by a box or border 38. The displayed phrase of text 34A, as a whole, is not centered to avoid the eye tracking problem.

Figure 2B:
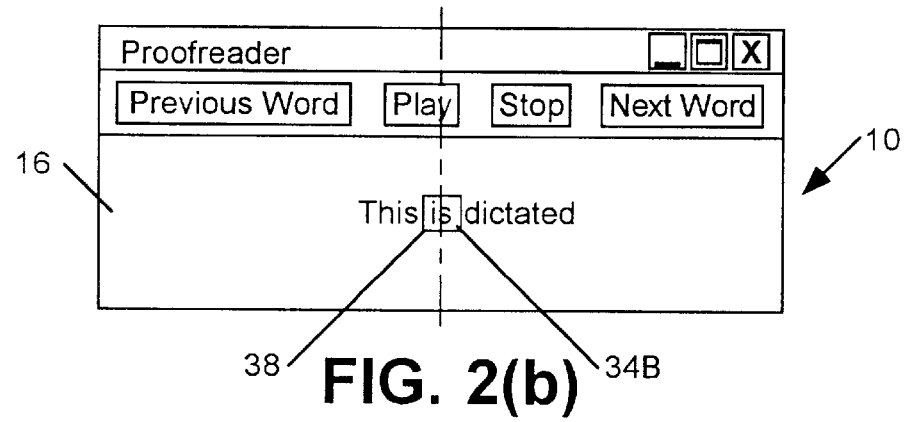
Figure 2C:
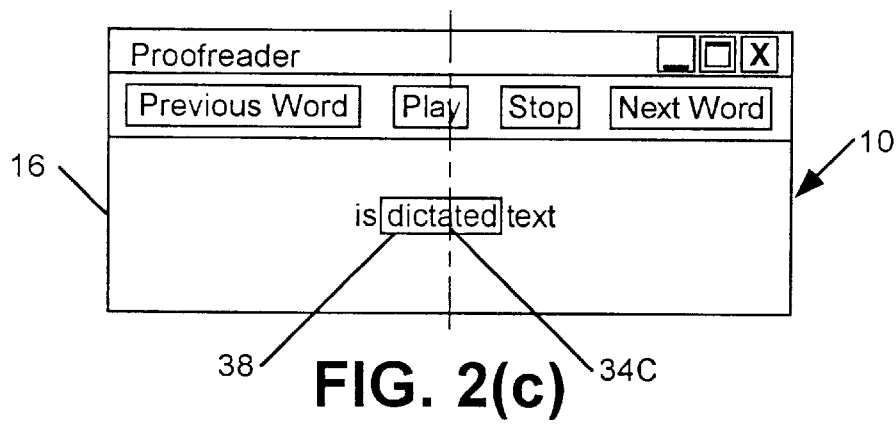
Figure 2D:
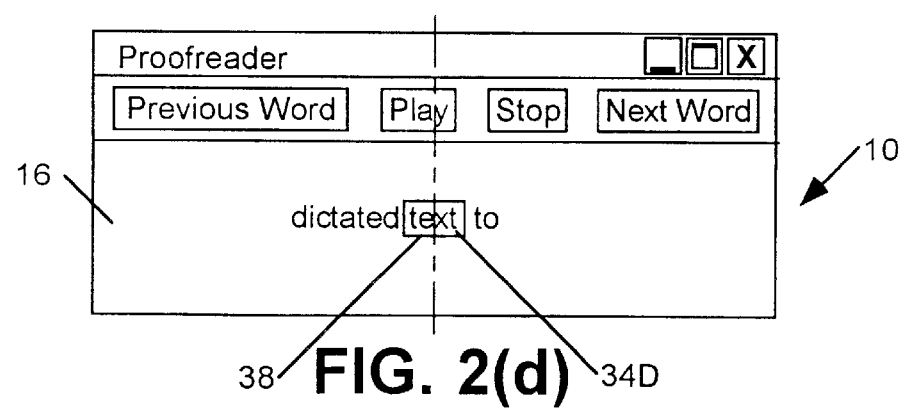

Invoking the Next Word command results in the display as shown in FIG. 2(b). The text 34A has been replaced by text 34B, which is the phrase "This is dictated". The target word "is" is visually marked and is centered, even though the phrase as a whole is not centered.

Figure 3A:
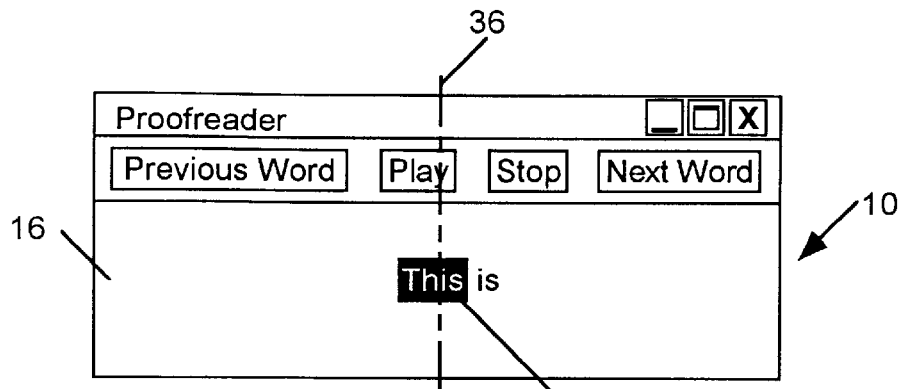
FIGS. 3(a)–3(d) illustrate the graphical user interface showing a third method for sequentially displaying retrieved text in a proofreader in accordance with the inventive arrangements.
Figure 3B:
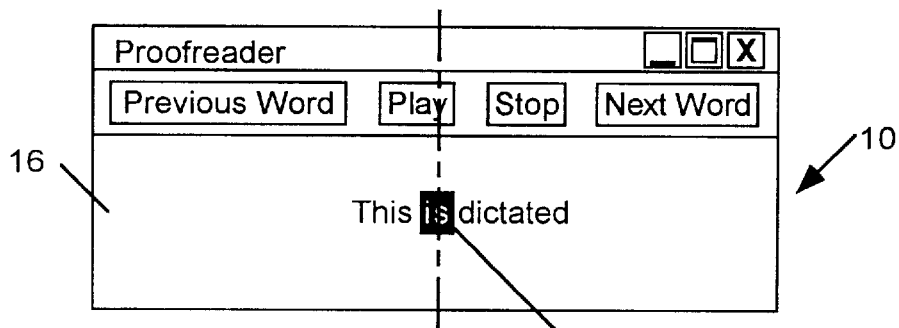
Figure 3C:
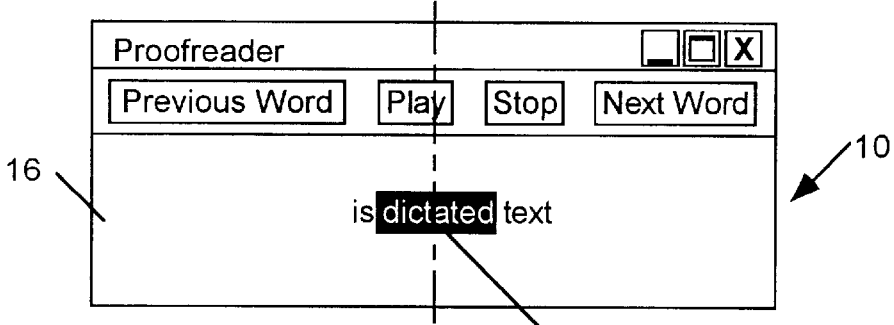

Invoking the Next Word command again results in the display as shown in FIG. 3(c). The text 34A has been replaced by text 34B, which is the phrase "is dictated text". The target word "dictated" is visually marked and is centered, even though the phrase as a whole is not centered.

Figure 3D:
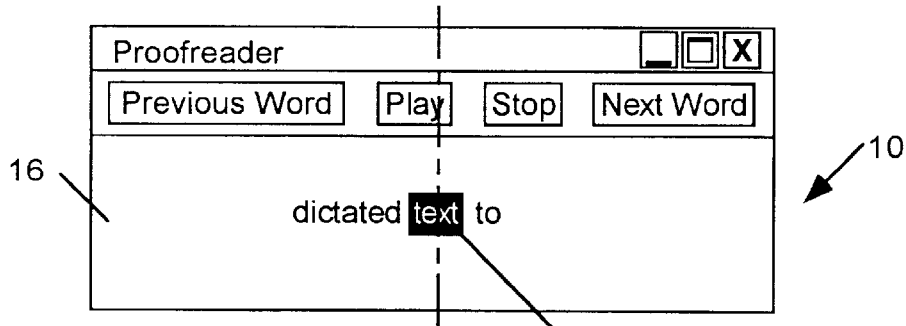

Invoking the Next Word command yet again results in the display as shown in FIG. 3(d). The text 34A has been replaced by text 34B, which is the phrase "dictated text to". The target word "text" is visually marked and is centered, even though the phrase as a whole is not centered.

The displays shown in FIGS. 2(a)–1(d) can also be accompanied by an audible playback of the retrieved text, as explained in connection with FIGS. 1(a)–1(d).

FIGS. 3(a)–3(d) illustrate the GUI 10 in accordance with the inventive arrangements shows an alternative embodiment of the second method in accordance with the inventive arrangements for sequentially displaying retrieved text in a proofreader. The target word of the retrieved text 34A–34D is visually marked by inverse display 40, wherein the text is white on a black block background.

Figure 4:
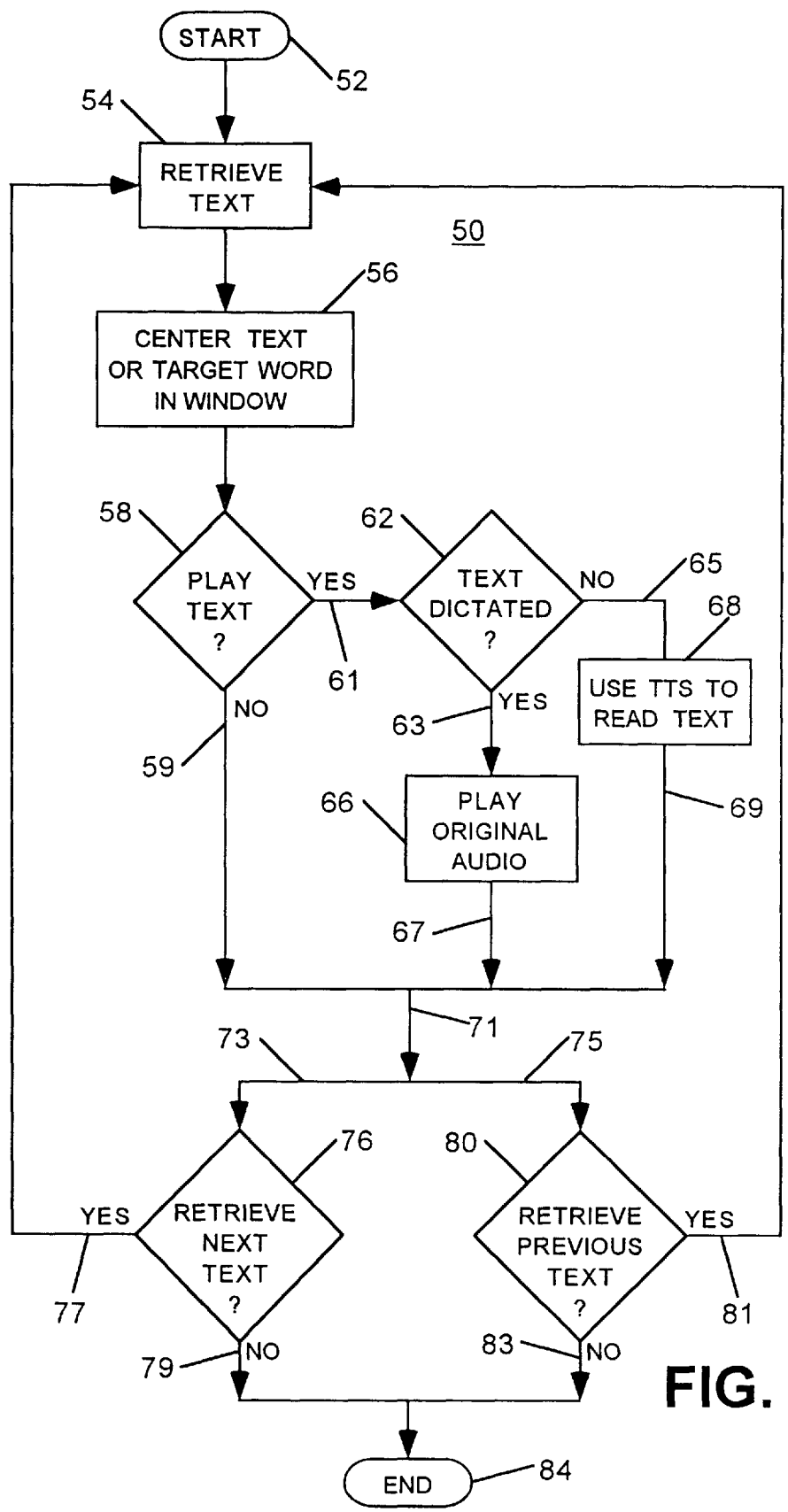
FIG. 4 is a flow chart useful for explaining the method for displaying retrieved text in a proofreader in accordance with the inventive arrangements.
Figure 5A:
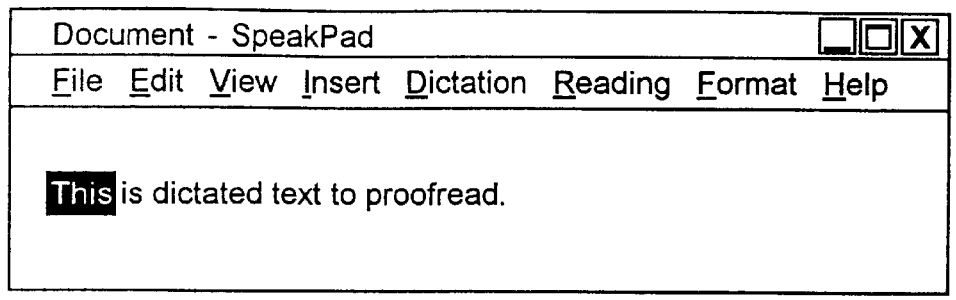
FIGS. 5(a)–5(d) illustrate a graphical user interface showing the prior art method for sequentially displaying retrieved text.
Figure 5B:
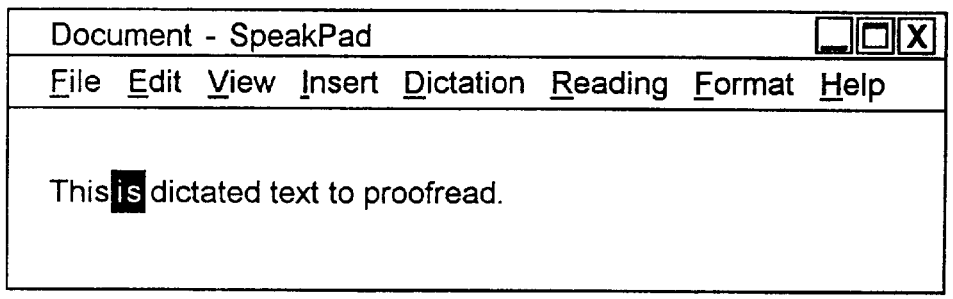
Figure 5C:
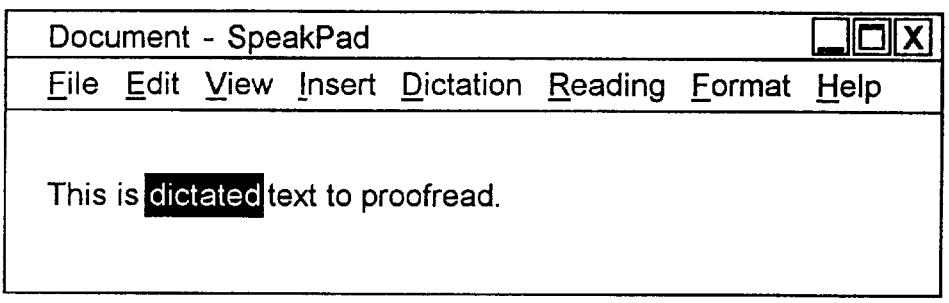
Figure 5D:
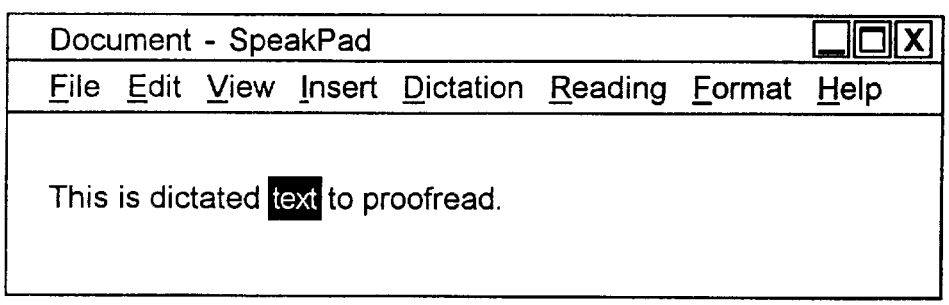

A method for implementing the displays shown in FIGS. 1–3 is illustrated by the flow chart 50 shown in FIG. 4. The proofreader is started in block 52. The proofreader retrieves the first text to be proofread from a previous dictation session in accordance with the step of block 54. The retrieved text is displayed in a centered position in the display window of a graphical user interface, such as GUI 10 shown in FIGS. 1–3, in accordance with the step of block 56. In the event that the text is retrieved as contextual phrases including a target word as well as the words immediately before and after the target word, it the target word which is displayed in the centered position, even if the contextual phrase, as a whole, is not centered. In the event the retrieval mode is one word at a time, and in the event the retrieved text is a compound word or a phrase recognized during dictation as a single word, the compound word or phrase will be centered in the display. In the event the retrieval mode is contextual phrases, and in the event the target word is a compound word or a phrase recognized during dictation as a single word, the compound word or phrase will be centered in the display, together with the immediately preceding and following words.

In accordance with decision block 58, the user can choose to have the text accompanied by a playback of the text, or playback of the target word of a contextual phrase. Alternatively, the playback can be automatic, or implemented as a preference which needs to be selected only once. If no playback is selected, the method branches on path 59 to nodal path 71.

If playback is desired, the method branches on path 61 to decision block 62, which determines whether or not there is a recording of the dictated text. If there is a recording, the method branches on path 63 to the step of block 66, in accordance with which the original recording of the text is played back though an audio interface, which can be integrated with the graphical user interface 10. After playing the original audio, the method proceeds on path 67 to nodal path 71. If there is no recording, the method branches on path 65 to the step of block 68, in accordance with which a text-to-speech (TTS) engine is used to audibly read the text. After playing the text with TTS, the method proceeds on path 69 to nodal path 71.

Nodal path 71 is a junction between input paths 59, 67 and 69 and output paths 73 and 75. Following output path 73 leads to decision block 76, which determines if the next text is to be retrieved. If the next text is retrieved, the method branches on path 77 and returns to the retrieving text step of block 54. Following output path 75 leads to decision block 80, which determines if the previous text is to be retrieved. If the previous text is retrieved, the method branches on path 81 and returns to the retrieving text step of block 54. If neither the next text nor the previous text is retrieved, in accordance with decision blocks 76 and 80 respectively, the method branches on path 79 and 83 respectively to end the process in accordance with the step of block 84.

The centering step of block 56 can be implemented by determining the width of the current word with respect to the width of the display window, the coordinate system and the current font. These criteria provide sufficient information to establish the center of the display and the center of the text, whether a single word, compound word or contextual phrase. The text can then be displayed so that the center of the text and the center of the display window substantially coincide with one another.

In the case of automatic playback, a sequence of words is audibly played as one unit by either a speech or TTS engine. As each word is played, the engine notifies the proofreader through the execution of a function denoted WordPosition callback. As input, the engine provides a value identifying the word being played. Such a value can be an offset into the text string or can be some other form of identifier. In any event, the method of flowchart 50 can be utilized within the WordPosition callback to display the word's text in accordance with block 54. Moreover, if specific variables are set to ensure that decision blocks 58, 76 and 80 are negative, no attempt is made to audibly play the word, as subsequent words will be indicated by the execution of further WordPosition callbacks.

Retrieving text sequentially and always displaying retrieved text in a centered position in a display window significantly improves proofreading efficiency. Proofreading efficiency can be further improved, where appropriate, by playing back retrieved text and/or by sequentially retrieving contextual phrases instead of single words.

What is claimed is:

1. A method for displaying text in a proofreader associated with a speech recognition application, comprising the steps of:
    retrieving initial text from a text document responsive to a user request;
    first centering and displaying said initial text in a display window of a graphical user interface;
    retrieving further text from said text document responsive to a further user request;
    second centering and displaying said further text in place of said initial text in said display window; and,
    repeating said retrieving further text step and said second centering and displaying step until no further text is requested.

2. The method of claim 1, comprising the step of retrieving previous text for use in said second centering and displaying step.

3. The method of claim 1, comprising the step of retrieving following text for use in said second centering and displaying step.

4. The method of claim 1, further comprising the step of audibly playing said displayed text responsive to a user request.

5. The method of claim 1, further comprising the step of automatically playing said displayed text.

6. The method of claim 4, further comprising the steps of:
    playing an audio recording of said displayed text if an original audio recording of said displayed text as dictated is available; and, playing said displayed text with a text-to-speech engine if said original audio recording is not available.

7. The method of claim 5, further comprising the steps of:

playing an audio recording of said displayed text if an original audio recording of said displayed text as dictated is available; and, playing said displayed text with a text-to-speech engine if said original audio recording is not available.

8. The method of claim 1, further comprising the steps of:

retrieving said initial text and said further text as contextual phrases including a target word and words immediately preceding and following said target word;

third centering and displaying said target word in said display window even if each said contextual phrase as a whole is not centered in said display window.

9. The method of claim 1, wherein said initial text and said further text are contextual phrases including a target word and words immediately preceding and following said target word.

10. The method of claim 9, wherein said target words of said contextual phrases are centered and displayed in said display window even if each said contextual phrase as a whole is not centered in said display window.

11. The method of claim 9, further comprising the step of visually marking said target word.

12. The method of claim 9, further comprising the step of highlighting said target word.

13. The method of claim 9, further comprising the step of displaying said target word in a box.

14. The method of claim 9, further comprising the step of inversely displaying said target word.

15. The method of claim 1, further comprising the step of selectively retrieving previous text and following text for use in said replacing step.

16. The method of claim 15, further comprising the step of generating said graphical user interface with user activatable icons for selectively retrieving said previous and following text.

17. The method of claim 15, further comprising the step of selectively retrieving said previous and following text responsive to voice commands.

18. A program routine of instructions stored in a fixed medium for displaying text in a proofreader associated with a speech recognition application, said program routine of instructions comprising:

means for generating a user interface having a display window;

means for retrieving initial text from a text document responsive to a user request;

means for centering and displaying said initial text in said display window;

means for retrieving further text from said text document responsive to a further user request; and, means for centering and displaying said further text in place of said initial text in said display window.

19. The program routine of instructions of claim 18, further comprising:

means for retrieving said initial text and said further text as contextual phrases including a target word and words immediately preceding and following said target word; and, means for centering and displaying said target word in said display window even if each said contextual phrase as a whole is not centered in said display window.

20. The program routine of instructions of claim 19, further comprising means for generating user activatable icons for selectively retrieving said previous and following text.

21. The program routine of instructions of claim 20, further comprising means for selectively retrieving said previous and following text responsive to voice commands.

22. The program routine of instructions of claim 19, further comprising means for selectively retrieving said previous and following text responsive to voice commands.

23. The program routine of instructions of claim 19, further comprising means for visually marking said target word.

24. The program routine of instructions of claim 18, further comprising means for audibly playing said displayed text responsive to a user request.

25. The program routine of instructions of claim 18, further comprising means for automatically playing said displayed text.

* * * * *